No. 11,759. Reissued July 11, 1899.
J. A. POCHÉ.
INSULATION OF ELECTRIC WIRES.
(Application filed Apr. 10, 1899.)
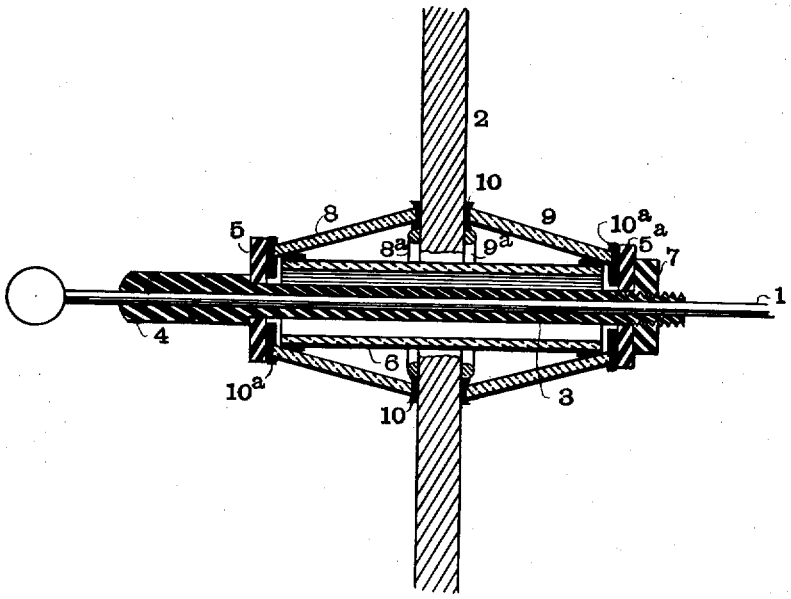
WITNESSES:
A. de Bonneville
W. H. Stubbs
INVENTOR
JOSEPH A. POCHE
BY
Edward P. Thompson
ATTORNEY

UNITED STATES PATENT OFFICE.

JOSEPH ARTHUR POCHÉ, OF NEW ORLEANS, LOUISIANA.

INSULATION OF ELECTRIC WIRES.

SPECIFICATION forming part of Reissued Letters Patent No. 11,759, dated July 11, 1899.

Original No. 608,906, dated August 9, 1898. Application for reissue filed April 10, 1899. Serial No. 712,427.

*To all whom it may concern:*

Be it known that I, JOSEPH ARTHUR POCHÉ, a citizen of the United States, residing at New Orleans, in the parish of Orleans and State of Louisiana, have invented new and useful Improvements in Insulation of Wires Carrying Electric Currents of High Potential, of which the following is a specification.

My invention relates to means for the insulation of wires carrying electric currents of high potential. It is my object to provide means for leading such wires through walls or partitions or any similar structures where the conductors are brought into close proximity with material that may be either combustible or capable in some degree of conduction, or both.

My invention is particularly adapted to the conductors used in connection with such generators as the Wimshurst influence-machine or the Holtz, the tension in the former frequently being maintained at a point where it would break through any of the known forms of insulation with ease.

My invention consists of the several novel features of construction and new combinations of parts hereinafter fully explained and then particularly pointed out and defined in the claims.

Referring to the accompanying drawing, showing my invention, the figure is a sectional view representing a wall insulation in which my invention is embodied.

The reference-numeral 1 in said drawing designates an electric conductor—such, for example, as the prime conductor upon any ordinary form of influence-machine. This conductor is shown as being carried through a wall or partition 2.

Immediately surrounding the wire 1 is a sleeve or tube 3, of hard rubber, of such length as to extend for some distance upon each side of the partition 2. At one end the sleeve is provided with an enlargement 4, against which rests a washer or collar 5, also of hard rubber.

The numeral $5^a$ indicates a washer similar to the washer 5, which is slipped upon the conductor-incasing sleeve 3. Loosely surrounding the conductor and its incasing sleeve and arranged between the washers 5 and $5^a$ is a heavy glass tube 6. A nut 7 is in screw-threaded engagement with the threaded extremity of the hard-rubber sleeve 3, and the function of this nut is to firmly press the opposite ends of hollow truncated cones 8 9 against the partition 2 and the washers 5 and $5^a$, thus retaining the conductor 1 firmly in a position in the center of the aperture in the partition and out of all possible contact with the walls of said aperture and securely insulated from all possible leakage.

In the bases of the cones 8 9 I secure by suitable rings $8^a$ and $9^a$ soft-rubber gaskets 10, which when the parts are assembled and compacted by the nut 7 are compressed between the edges of the cones 8 9 and the partition and form air and water tight connections between said cones and the partition. I prefer also to arrange rubber gaskets $10^a$ between the washers 5 and $5^a$ and the ends of the truncated cones for a similar purpose.

By this method of insulation the truncated cones, which are caused to bind upon each side of the partition, hold the wire or conductor 1 and its inclosing tube 3 centrally and away from the material composing the wall. Moreover, to endanger the latter it would be necessary for the current to break through the insulation or to jump from the extreme end of the tube 3 back to the wall. The employment of this insulation upon the ordinary influence-machine has increased the sparking distance from the radius of the disk to two-thirds of its diameter, showing that a large loss by leakage has been effectually avoided.

What I claim is—

1. An insulation for conductors carrying currents of high potential, consisting of a surrounding insulating-sleeve and two inclosing glass cones, retained by a collar at one end and a nut at the other, substantially as described.

2. An insulation for high-potential circuits, composed of a surrounding tube, or tubes, two truncated glass cones inclosing the same, a collar and nut to press and hold said cones together, and rubber gaskets secured at the bases of said cones, substantially as described.

3. An insulation for high-potential circuits, consisting of an insulating-tube surrounding the wire and passing through a wall or partition, a collar at one end and a nut at the other, and two truncated glass cones placed one on each side of the wall and provided with elastic gaskets in their bases, pressed against the wall by the nut to form an air and water tight connection, substantially as described.

4. The combination with a partition having an aperture, of a conductor passing centrally through said aperture, insulating-inclosures surrounding said conductor and bearing against said partition in an air and water tight and electrically-insulated condition, and provided with openings for the passage of said conductor, said openings being plugged up around the conductor in an air and water tight and electrically-insulated condition, and located on opposite sides of said partition, said inclosures extending to predetermined distances on both sides of the wall.

5. The combination with a wall or partition 2, or any similar structure, having an aperture, of an insulating air and water tight tube passing centrally through the aperture, an electric conductor passing through said tube, and an air and water tight inclosing air-chamber for the tube and conductor.

6. The combination with a partition having an aperture, of a conductor passing centrally through said aperture, an inclosure of insulating material holding the conductor out of contact with the partition in an air and water tight and electrically-insulated condition, and surrounding said conductor on both sides of the partition for a predetermined distance, and out of contact therewith, so as to form an air-envelop around the conductor throughout the whole length of the inclosure, and provided with openings at the ends for the passage of said conductor, which are plugged up around the conductor in an air and water tight and electrically-insulated condition.

Signed this 13th day of March, 1899.

JOSEPH ARTHUR POCHÉ. [L. S.]

Witnesses:

CH. H. DREYFUS,

ALBERT GUILBAULT.